(12) United States Patent
Takakura et al.

(10) Patent No.: US 8,868,805 B2
(45) Date of Patent: Oct. 21, 2014

(54) STORAGE DEVICE AND CONTROL METHOD FOR STORAGE DEVICE

(71) Applicant: Fujitsu Limited, Kawasaki (JP)

(72) Inventors: Atsushi Takakura, Kawasaki (JP); Kenji Hattori, Odawara (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/924,000

(22) Filed: Jun. 21, 2013

(65) Prior Publication Data

US 2014/0068121 A1 Mar. 6, 2014

(30) Foreign Application Priority Data

Aug. 29, 2012 (JP) ................................. 2012-188746

(51) Int. Cl.
*G06F 3/00* (2006.01)
*G06F 13/12* (2006.01)
*G06F 3/06* (2006.01)
*G06F 11/20* (2006.01)
*G06F 13/10* (2006.01)
*H04L 29/08* (2006.01)

(52) U.S. Cl.
CPC .............. *G06F 13/10* (2013.01); *G06F 3/0635* (2013.01); *G06F 11/20* (2013.01); *G06F 3/0617* (2013.01); *G06F 3/0689* (2013.01); *G06F 3/0661* (2013.01); *G06F 3/067* (2013.01); *H04L 67/1097* (2013.01)
USPC .............................................. 710/74; 710/36

(58) Field of Classification Search
None
See application file for complete search history.

(56) References Cited

U.S. PATENT DOCUMENTS

2009/0144466 A1 6/2009 Takayama et al.

FOREIGN PATENT DOCUMENTS

| JP | 2005-078595 | 3/2005 |
| JP | 2009-140062 | 6/2009 |

*Primary Examiner* — Idriss N Alrobaye
*Assistant Examiner* — Richard B Franklin
(74) *Attorney, Agent, or Firm* — Fujitsu Patent Center

(57) ABSTRACT

A storage device, which is to be connected with hosts each having host-side communication ports and a multipath driver, includes logical storage units; communication ports; a driver type judging part that stores into a storage, when a prescribed SCSI command that a non-TPGS-compliant multipath driver does not transmit is received from a host by one of the communication ports, information indicating that the TPGS-compliant multipath driver is used in the host; and a command processing part, with respect to a SCSI command received via a communication path that is set as a standby path, judges by referring to the storage whether the TPGS compliant multipath driver is used in a host that transmitted the SCSI command, and, if the TPGS compliant multipath driver is not used in the host, processes the SCSI command assuming that the communication path is not the standby path.

7 Claims, 4 Drawing Sheets

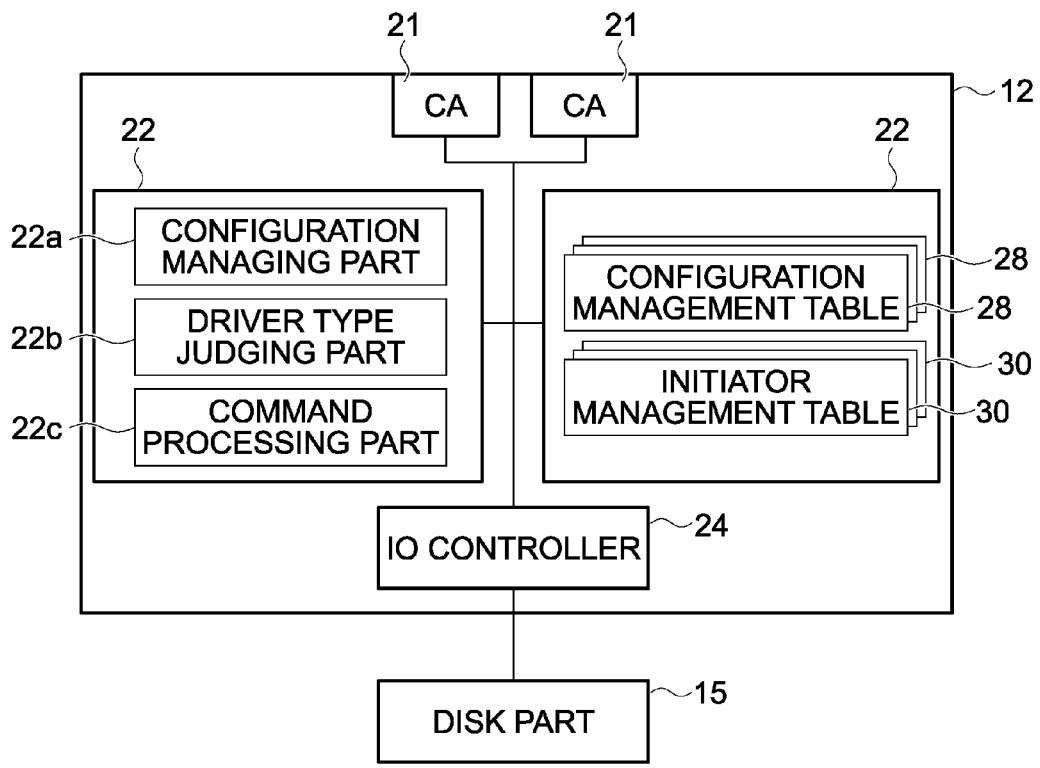
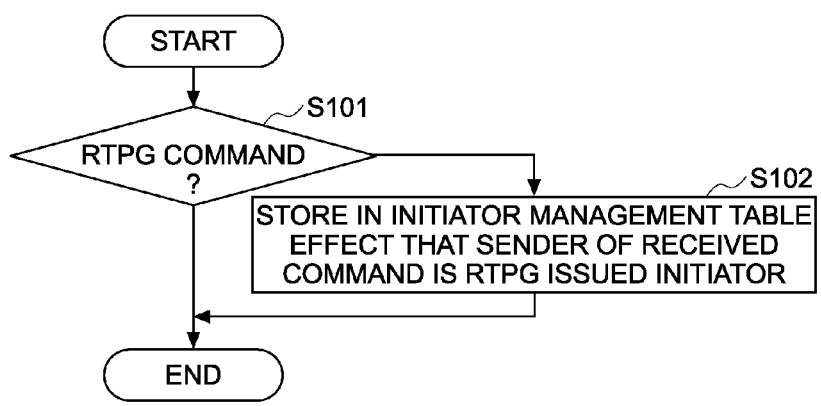

| INDEX | IDENTIFIER | INTERNAL CONTROL NUMBER | THREAD REGION |
|---|---|---|---|
| 0 | XXXXXXXXXXXXXXXX | 0x01 | |
| 1 | YYYYYYYYYYYYYYYY | 0x03 | RTPG ISSUED INITIATOR |
| ⋮ | ⋮ | ⋮ | ⋮ |
| n | ZZZZZZZZZZZZZZZZ | 0x0m | RTPG ISSUED INITIATOR |

STORAGE DEVICE AND CONTROL METHOD FOR STORAGE DEVICE

CROSS-REFERENCE TO RELATED APPLICATION

This application is based upon and claims the benefit of priority of the prior Japanese Patent Application No. 2012-188746, filed on Aug. 29, 2012, the entire contents of which are incorporated herein by reference.

FIELD

The present invention relates to a storage device, a control method for a storage device, and a non-transitory computer-readable recording medium.

BACKGROUND

As a storage device, there exists a device (see, for example, the patent literatures 1 and 2) that can be connected with several servers via multiple paths. Such a storage device of late years is generally a device (which will be hereinafter called a conventional device) that is put to use by installing a TPGS (Target Port Group Support) compliant multipath driver on each of its hosts.

CITATION LIST

Patent Literature 1: Japanese Laid-Open Patent Document No. 2009-140062
Patent Literature 2: Japanese Laid-Open Patent Document No. 2005-78595

There are cases where a non-TPGS-compliant multipath driver in a host misunderstands the status of the conventional device, and therefore the conventional device is a device where an unintended error may occur when the non-TPGS-compliant multipath driver is being used in its host.

To be specific, the conventional device is so configured as to return a sense of "2 (NOT READY)/040B (LOGICAL UNIT NOT ACCESSIBLE TARGET PORT IN STANDBY STATE)" when receiving, via a standby path, a command to which a sense is to be returned.

Then, the TPGS-compliant multipath driver having received the sense "2/040B" recognizes that the path used to transmit the command is a standby path, and then performs retransmission of the command using another path, etc.

On the other hand, the non-TPGS-compliant multipath driver is a driver that does not need to be able to recognize the meaning of the sense "2/040B" (a driver to which operation to the sense of "2/040B" is not specified). Hence, when the conventional device is used with the non-TPGS-compliant multipath driver, there are cases where the non-TPGS-compliant multipath driver misunderstands the status of the conventional device, which results an unintended error.

SUMMARY

According to an aspect of the disclosed technique, a storage device to be connected with a plurality of hosts each having a plurality host-side communication ports and a multipath driver, comprises: a plurality of logical storage units; a plurality of communication ports each of which is to be connected with one or more host-side communication ports; a driver type judging part that stores into a storage, when a prescribed SCSI command that a Target Port Group Support (TPGS) compliant multipath driver transmits but a non-TPGS-compliant multipath driver does not transmit is received by any one of the plurality of communication ports, information indicating that the multipath driver used in a host that has transmitted the prescribed SCSI command is the TPGS-compliant multipath driver; and a command processing part that processes each SCSI command received by the plurality of communication ports, wherein the command processing part, with respect to a SCSI command received via a communication path that is set by a user as a standby path, judges by referring to the storage whether or not a TPGS compliant multipath driver is used in a host that transmitted the SCSI command, and, if the TPGS compliant multipath driver is used in the host, sends back to the host a sense indicating that the communication path is the standby path, and, whereas if the TPGS compliant multipath driver is not used in the host, processes the SCSI command assuming that the communication path is not the standby path.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a functional block diagram of the CM included in the storage device according to the embodiment;

FIG. 4 is a flowchart of a driver type judging process executed by a driver type judging part;

DESCRIPTION OF EMBODIMENTS

An embodiment of the present invention will hereinafter be described in depth with reference to the drawings.

To start with, a configuration and a use manner of a storage device 10 according to the present embodiment will be explained referring to FIGS. 1 and 2.

The storage device 10 (FIG. 1) according to the present embodiment is a device developed on the assumption that it will be connected via multiple paths to a plurality of hosts 50 each having a TPGS (Target Port Group Support) compliant multipath driver or a non-TPGS-compliant multipath driver.

Figure 1:
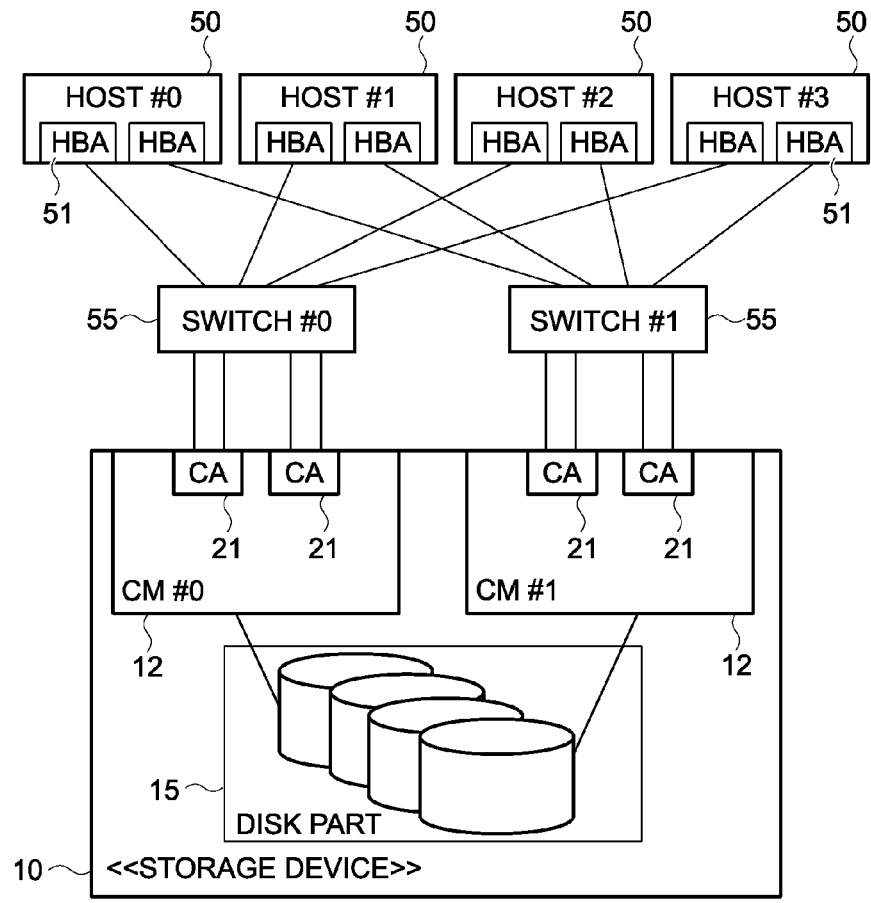
FIG. 1 is an explanatory diagram of a configuration and a use manner of a storage device according to the embodiment.

As illustrated in FIG. 1, the storage device 10 includes two controller modules 12 (which are hereinafter abbreviated to CMs 12) and a disk part 15.

The disk part 15 is a unit that contains a plurality of hard disk drives. The CM 12 is a unit (module) that makes the disk part 15 function as a plurality of logical storage units (which are so-called logical units).

Figure 2:
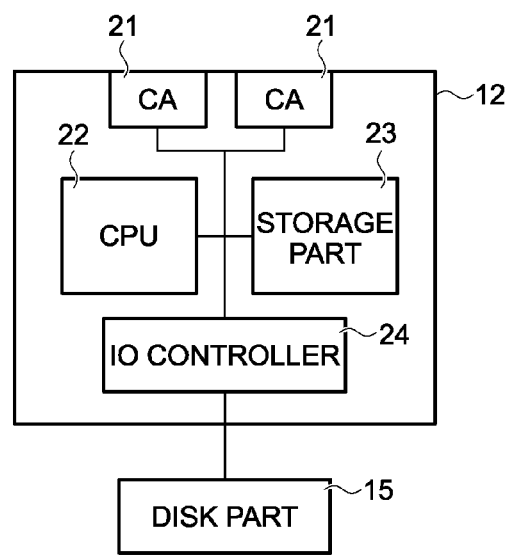
FIG. 2 is a block diagram of a CM included in the storage device according to the embodiment.

As illustrated in FIG. 2, the CM 12 includes two CAs (Communication Adapters) 21, a CPU (Central Processing Unit) 22, a storage part 23 and an IO (Input-Output) controller 24.

Each CA 21 included in the CM 12 is a unit to communicate with the hosts 50 via fibre channel, iSCSI (Internet Small Computer System Interface), etc. Each CA 21 includes a plurality of ports (communication ports; see FIG. 1) that are to be connected with several HBAs (Host Bus Adapters) 51 through a switch 55.

The storage part 23 (FIG. 2) is a unit containing a RAM (Random Access Memory), a flash ROM (Read Only Memory) stored with a control program (firmware) which will be executed by the CPU 22, and so on. The IO controller 24 is a unit that performs input/output control between the disk part 15 (each hard disk drive in the disk part 15). The CPU 22 is a unit that integrally controls individual parts in the CM 12 in accordance with the control program.

The next discussion will be focused on operation/function of the storage device 10.

FIG. 3 is a functional block diagram of the CM 12 included in the storage device 10. As depicted in FIG. 3, the CPU 22 which is operating in accordance with the control program functions as a configuration managing part 22a, a driver type judging part 22b, and a command processing part 22c.

The driver type judging part 22b is a unit (functional block) that performs, every time when a SCSI command (an encapsulated command) is received by one port across all CMs 12, a driver type judging process whose procedures are shown in FIG. 4.

Namely, when a port (hereinafter a receiving port) receives a SCSI command (hereinafter a received command), the driver type judging part 22b judges whether the received command is a RTPG command (step S201). Note that, although a detailed explanation of the RTPG (Report Target Port Groups) command is omitted, only the TPGS-compliant multipath driver transmits this RTPG command.

When the received command is not the RTPG command (step S101; NO), the driver type judging part 22b ends this driver type judging process (the processing of FIG. 4) without performing especial processing.

Whereas, when the received command is the RTPG command (step S101; YES), the driver type judging part 22b stores into an initiator management table 30 for the received port the effect that the source initiator of the received command is the RTPG issued initiator (step S102).

Figures 5, 6:
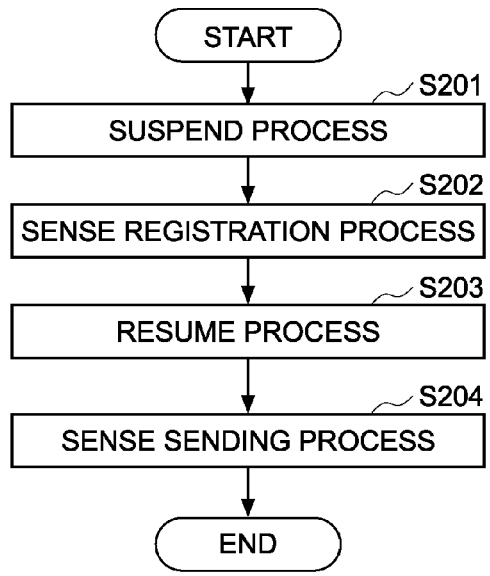
FIG. 5 is an explanatory diagram of an initiator management table.
FIG. 6 is a flowchart of a process on change of path status executed by a command processing part.

Herein, the initiator management table 30 is defined as a table that is prepared in the storage part 23 on port-by-port basis (see FIG. 3) and has a configuration illustrated in FIG. 5.

That is, the initiator management table 30 has an index field to which an index of each record in the table itself is set, and an identifier field to which an identifier (World Wide Name etc.) of the source HBA 51 of the received command is set. Further, the initiator management table 30 has an internal control number field to which an internal control number of the HBA 51 that is identified by the identifier in the same record is set. Furthermore, the initiator management table 30 has a thread region field to which information ("RTPG issued Initiator") indicating that the source HBA 51 of the received command is the RTPG issued initiator.

This initiator management table 30 is a table to which, when an initiator (HBA 51) logs in, a record related to the initiator is added and from which, when an initiator logs out, the record related to the initiator is deleted. Namely, when the process of step S102 is performed, a record related to the source HBA 51 of the received command already exists in the initiator management table 30 for the receiving port. Hence, at step S102, performed is only the processing of setting the information ("RTPG issued Initiator") indicating that the source HBA 51 of the received command is the RTPG issued initiator to the thread region field of the record.

The driver type judging part 22b having finished the processing of step S102 (FIG. 4) terminates the driver type judging process.

The configuration managing part 22a (FIG. 3) is basically a unit (functional block) that accepts an instruction to alter contents of one configuration management table 28 from a user through his/her operation against a host 50, and alters contents of the configuration management table 28 according to the accepted instruction.

Herein, the configuration management table 28 is a table that is prepared in the storage part 23 on port-by-port basis. The configuration management table 28 can hold an identifier of each HBA 51 connected to the port associated with itself (which will be hereinafter termed the associated port), information indicating whether the path between the each HBA 51 is a standby path or an active path, etc.

The configuration managing part 22a, when being instructed from the user to change the active path between a certain port and a certain HBA 51 into the standby path, alters the contents of the configuration management table 28 for the port according to the instruction. Furthermore, the configuration managing part 22a also performs processing of instructing the command processing part 22c to start a process on change of path status.

The process on change of path status that the command processing part 22c starts by the instruction from the configuration managing part 22a, is a process in the procedures illustrated in FIG. 6. For convenience of explanation, normal operation of the command processing part 22c will be discussed in advance of a detailed discussion on this process on change of path status.

Figure 7:
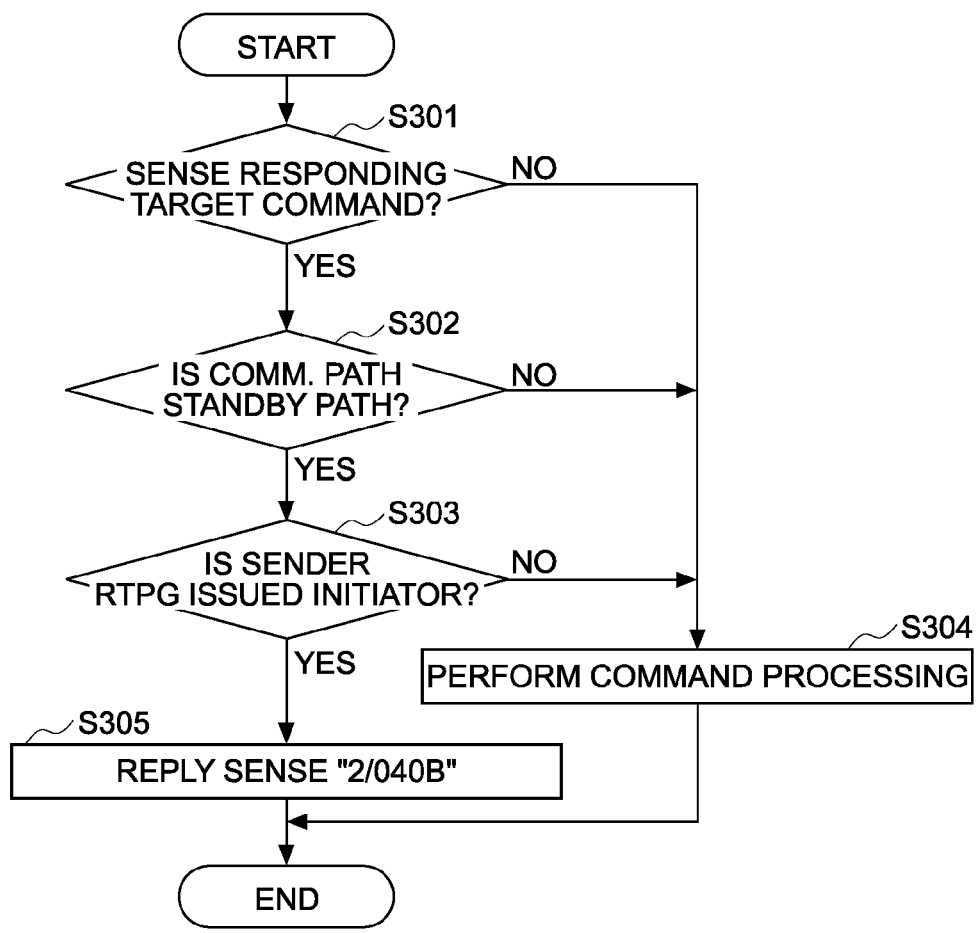
FIG. 7 is a flowchart of a command responding process executed by the command processing part.

The command processing part 22c usually performs a command responding process, whose procedures are illustrated in FIG. 7, on each SCSI command after the driver type judging process (FIG. 4).

That is, when processing a SCSI command (hereinafter a processing target command), the command processing part 22c, to begin with, judges whether the processing target command is a sense responding target command to which a reply of a sense is sometimes required (step S301).

When the processing target command is not the sense responding target command (step S301; NO), the command processing part 22c performs command processing (step S304). Incidentally, "to perform command processing" connotes "to perform processing whose contents are specified the processing target command (at step S304 performed after step S301, processing of responding to an inquiry command, for example)."

Then, the command processing part 22c having finished the processing of step S304 terminates the command responding process (the processing of FIG. 7), and, when the following SCSI command is already received, starts the command responding process for the following SCSI command.

On the other hand, when the processing target command is the sense responding target command (step S301; YES), the command processing part 22c judges whether the communication path of the processing target command (path used for transmitting the processing target command) is the standby path (step S302). More specifically, the command processing part 22c judges whether the information indicating that the path between the source initiator (the source HBA 51) of the processing target command is the standby path is stored on the configuration management table 28 for the port which having received the processing target command (which will hereinafter termed as the receiving port).

When the communication path of the processing target command is not the standby path (step S302; NO), the command processing part 22c performs the command processing (step S304), and thereafter terminates the command responding process. Incidentally, at step S304 performed after step S302, processing of controlling the hard disk drives in the disk part 15 through the IO controller 24 is performed, for example.

On the other hand, when the communication path of the processing target command is the standby path (step S302; YES), the command processing part 22c refers to the initiator management table 30 (FIG. 5) for the receiving port. Then, the command processing part 22c judges based on the information on the initiator management table 30 whether the source initiator of the processing target command is the RTPG issued initiator (step S303).

When the source initiator is the RTPG issued initiator (step S303; YES), the command processing part 22c sends back a sense of "2/040B" to the source initiator (step S305), and thereafter ends the command responding process.

Whereas, when the source initiator is not the RTPG issued initiator (step S303; NO), the command processing part 22c performs the command processing (step S304). That is, in this case, the command processing part 22c performs the command processing by ignoring the fact that the communication path is set to be the standby path.

Then, the command processing part 22c having finished the processing of step S304 ends the command responding process.

In short, when a command to which a reply of a sense is required is received via the standby path and the source driver of the command is the TPGS-compliant multipath driver, the sense "2 (NOT READY)/040B (LOGICAL UNIT NOT ACCESSIBLE TARGET PORT IN STANDBY STATE)" should be sent back. However, interpretations of the sense "2/040B" by the non-TPGS-compliant multipath drivers differ depending on their venders. Hence, it follows that returning the sense "2/040B" under the condition where the source driver of a command is the non-TPGS-compliant multipath driver may cause an unintended error.

On the other hand, ignoring the standby path setting and performing the command processing can cause no transmission of the sense "2/040B" to the non-TPGS-compliant multipath driver, which results in no unintended errors. For that reason, the storage device 10 (CM 12) is configured so as to perform the driver type judging process and the command responding process of the previous procedures.

Referring back to FIG. 6, the contents of the process on change of path status will be described.

As already explained, the process on change of path status is a process that the command processing part 22c makes the configuration managing part 22a perform when being instructed, from the user, to change the path (active path) between a certain port and a certain HBA 51 into the standby path.

As illustrated in FIG. 6, the command processing part 22c having started the process on change of path status, first, performs a suspend process (step S201).

The suspend process is a process of controlling the CA 21 so as to complete processing to each already received SCSI command and not to accept the SCSI command related to the path changed into the standby path this time (which will be hereinafter called the status changed path).

The command processing part 22c having finished the suspend process performs a sense registration process (step S202). This sense registration process is a process of registering (storing) information indicating that a sense "6/2A06" is to be returned at the time of a reception of the next SCSI command to each logical storage unit accessed via the status changed path. Note that, the sense "6 (UNIT ATTENTION)/ 2A06 (ASYMMETRIC ACCESS STATE CHANGE)" is a sense to urge a rebuild of the multipath configuration. The TPGS-compliant/non-TPGS-compliant multipath driver having received this sense, once logs out from the SAN (the Storage Area Network; the network which consists of the storage device 10, the hosts 50, etc.), and logs in again to the SAN.

The command processing part 22c having finished the sense registration process performs a resume process (step S203) of returning the status of the CA 21 to the usual status (the status where the CA 21 accepts also the SCSI commands related to the status changed path).

The command processing part 22c having finished the resume process starts the sense sending process (step S204) of sending a sense "6/2A06" to each logical storage unit according to the registered content by the sense registration process. Note that, the command processing part 22c having finished the resume process returns to the status where it performs the command responding process (FIG. 7) to each SCSI command to which the driver type judging process is already performed. Namely, the command processing part 22c having finished the resume process operates in such a status where it responds to the SCSI command for each logical storage unit via the status changed path by sending back the sense "6/2A06," and it performs the command responding process to each of other SCSI commands.

Then, the command processing part 22c having finished the sense sending process ends the process on change of path status.

As described above, the storage device 10 according to the present embodiment judges which one of the TPGS-compliant multipath driver and the non-TPGS-compliant multipath driver is used in each host 50 based on whether a command that only the TPGS-compliant multipath driver transmits is received or not. And, the storage device 10, when receiving a command from the host 50 in which the TPGS-compliant multipath driver is used via a path set to be the standby path, processes the command in a way that ignores the standby path setting. Consequently, with the storage device 10 used, it is possible to create the SAN where the non-TPGS-compliant multipath driver does not receives the sense "2/040B" and therefore does not misunderstand the status of the storage device 10.

Moreover, the storage device 10 has a configuration where the setting of a path status (the setting related to whether a path is used as an active path or a standby path) can be done for every combination of an HBA and a port (for every so-called I_T Nexus).

On the other hand, the existing storage device is a device to which the setting of a path status must be done for every combination of an HBA, a port and a logical storage unit (for every I_T_L Nexus). And, in a case where the setting of a path status must be set for every I_T_L Nexus, an operator may forget to change the path states for some paths. Therefore, it can also be said that the storage device 10 according to the present embodiment is a device where a probability that the operator will mistake in setting the path states is lower than the existing storage device.

<<Modified Embodiments>>

The storage device 10 described above can be modified in a variety of forms. For instance, the storage device 10 can be modified into a device which includes, instead of the above-mentioned plurality of configuration management tables 28 (the configuration management tables 28 each of which stores information related to a specific port), a table storing information related all the ports. Further, the storage device 10 may also be modified into a device that includes, instead of the above-mentioned plurality of initiator management tables 30, a table storing information about all the ports.

Furthermore, the storage device 10 can also be modified into a device to which the setting of a path status must be set for every combination of an HBA 51, a port and a logical storage unit (for every I_T_L Nexus). However, as described above, with the configuration where the setting of a path status can be done for every combination of an HBA and a port (for every so-called I_T Nexus) used, it is possible to lower the probability that the operator will mistake in setting the path states is lower than the existing storage device. Therefore, it is desirable to adopt the configuration of the above-mentioned embodiment.

It is taken for granted that the storage device 10 can be modified into a device of which the number of CMs 12, the number of CAs 21 in the CM 12 etc. are different from those described above, a device of which the CA 21 performs a part of the above-mentioned processing performed by the CPU 22, etc.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments) of the present invention have been described in detail, it should be understood that the various changes, substitutions, and alterations could be made hereto without departing from the spirit and scope of the invention.

What is claimed is:

1. A storage device to be connected with a plurality of hosts each having a plurality host-side communication ports and a multipath driver, the storage device comprising:
    a plurality of logical storage units;
    a plurality of communication ports each of which is to be connected with one or more host-side communication ports;
    a driver type judging part that stores into a storage, when a prescribed SCSI command that a Target Port Group Support (TPGS) compliant multipath driver transmits but a non-TPGS-compliant multipath driver does not transmit is received by any one of the plurality of communication ports, information indicating that the multipath driver used in a host that has transmitted the prescribed SCSI command is the TPGS-compliant multipath driver;
    a command processing part that processes each SCSI command received by the plurality of communication ports, wherein the command processing part, with respect to a SCSI command received via a communication path that is set by a user as a standby path, judges by referring to the storage whether or not a TPGS compliant multipath driver is used in a host that transmitted the SCSI command, and, if the TPGS compliant multipath driver is used in the host, sends back to the host a sense indicating that the communication path is the standby path, and, whereas if the TPGS compliant multipath driver is not used in the host, processes the SCSI command assuming that the communication path is not the standby path.

2. The storage device according to claim 1, further comprising:
    a configuration management table that stores, with respect to each combination of a host-side communication port and a communication port, information indicating that a communication path between them is an active path or a standby path; and
    a configuration managing part that alters contents of the configuration management table to contents specified by the user,
    wherein the command processing part operates referring to the configuration management table.

3. The storage device according to claim 2, wherein the configuration managing part, when being instructed to set a communication path between a host-side communication port and a communication port, alters contents of the configuration management table and starts a configuration change notification process of, when next SCSI command to each logical storage unit is received via the communication path, sending back to a sender of the SCSI command a sense to urge to rebuild multipath configuration.

4. The storage device according to claim 1, wherein the prescribed SCSI command is an RTPG (REPORT TARGET PORT GROUPS) command.

5. The storage device according to claim 3, wherein the sense sent back by the configuration change notification process is "6/2A06."

6. A control method for a storage device having a plurality of communication ports which are to be connected via multiple paths with a plurality of hosts each having a plurality host-side communication ports and a multipath driver, a processor executing:
    storing into a storage, when a prescribed SCSI command that a Target Port Group Support (TPGS) compliant multipath driver transmits but a non-TPGS-compliant multipath driver does not transmit is received by any one of the plurality of communication ports, information indicating that the multipath driver used in a host that has transmitted the prescribed SCSI command is the TPGS compliant multipath driver;
    upon processing each SCSI command received by the plurality of communication ports, with respect to a SCSI command received via a communication path that is set by a user as a standby path, judging by referring to the storage whether or not a TPGS compliant multipath driver is used in a host that transmitted the SCSI command, and, if the TPGS compliant multipath driver is used in the host, sending back to the host a sense indicating that the communication path is the standby path, and, whereas if the TPGS compliant multipath driver is not used in the host, processing the SCSI command assuming that the communication path is not the standby path.

7. A non-transitory computer-readable recording medium having stored therein a program that is executed by a processor in a storage device having a plurality of communication ports which are to be connected via multiple paths with a plurality of hosts each having a plurality host-side communication ports and a multipath driver, the program causing the processor to execute a process comprising:
    storing into a storage, when a prescribed SCSI command that a Target Port Group Support (TPGS) compliant multipath driver transmits but a non-TPGS-compliant multipath driver does not transmit is received by any one of the plurality of communication ports, information indicating that the multipath driver used in a host that has transmitted the prescribed SCSI command is the TPGS compliant multipath driver;
    upon processing each SCSI command received by the plurality of communication ports, with respect to a SCSI command received via a communication path that is set by a user as a standby path, judging by referring to the storage whether or not a TPGS compliant multipath driver is used in a host that transmitted the SCSI command, and, if the TPGS compliant multipath driver is used in the host, sending back to the host a sense indicating that the communication path is the standby path, and, whereas if the TPGS compliant multipath driver is not used in the host, processing the SCSI command assuming that the communication path is not the standby path.

\* \* \* \* \*